Patented Jan. 29, 1946

2,393,800

UNITED STATES PATENT OFFICE 2,393,800

VALVE LUBRICANTS

John D. Morgan, South Orange, and Russell E. Lowe, East Orange, N. J., assignors to Cities Service Oil Company, New York, N. Y., a corporation of Pennsylvania No Drawing. Application August 14, 1944, Serial No. 549,493

7 Claims. (Cl. 252—51.5)

This invention relates to lubricants and more particular to grease-like compositions for lubricating stopcocks, plug valves, gaskets and other devices which are subject to the solvent action of gasoline, light petroleum fractions, or water.

It is a matter of common general knowledge that stopcocks in gasoline supply lines have a constant tendency to stick because of inadequate lubrication. An occurrence of this kind is generally of little importance to the driver of an automobile or a motor boat beyond causing him some annoyance and perhaps some slight delay. In the operation of aircraft, however, sticking of a stopcock in a fuel supply line may mean a matter of life or death to the pilot, his crew, and passengers.

Ordinary petroleum oils and greases are not satisfactory lubricants for these valves because of the solubility of such substances in gasoline. Even the best grades of greases are rapidly dissolved away, leaving bare surfaces in intimate contact with the almost inevitable results that the valve sticks when the next attempt is made to shift it between its open and closed positions. Such special lubricants as have been prepared for this type of service consist essentially of mixtures of soaps, oils, and solid matter such as graphite, mica and talc. These greases have not proven very satisfactory because the lubricating effect in the last analysis depends upon the rather small amount of loading material—the soap and oil are soon washed away, leaving only a thin film of graphite or other contained solid. Furthermore this type lubricant is not acceptable for Army-Navy aircraft operation because of the distinct possibility that the solid matter will be carried through the fuel lines and clog the jets of the carbureter. In addition, these loaded greases usually have a rather narrow working temperature range and tend to freeze solid at temperatures well above those encountered in any ordinary aircraft operation.

The principal object of the invention is to provide a grease-like composition which is insoluble in water and is highly resistant to dissolution by gasoline, toluene, naphtha and other light petroleum fractions over a wide range of temperatures, and which has lubricating properties that are well suited to use on stopcocks, plug valves, and the like.

It is a further object of the invention to provide a water and gasoline-insoluble lubricant which contains neither petrolatum, soap, or free solids, and which has good lubricating properties over a wide range of temperatures from well below zero to some point approaching 200° F.

Another object of the invention is to provide a valve lubricant in accordance with the foregoing which may be given the consistency of a soft cup grease or that of a hard grease, or again, almost any consistency between these two extremes which will render it most useful in meeting the requirements of individual lubricating problems.

We have discovered that mixtures of an octadecanoic amide such as stearamide, and glyceryl mono ricinoleate, in ratios by weight of from 1:4 to about 2:3 have excellent lubricating properties over a wide range of temperatures from a low of about —50° F. to a high which is on the order of 165° F. or above. In addition, we have found that these compositions are completely insoluble in water, even at elevated temperatures and are highly resistant to dissolution by aromatic gasoline, both at room temperatures and at temperatures up to 140° F. or even higher This combination of good lubricating values together with substantially complete insolubility in water and petroleum fractions makes the compositions extremely useful for lubricating stopcocks in aircraft gasoline lines or in fact any equipment which is normally subject to the solvent action of these liquids.

In preparing one lubricant in accordance with the invention we heated a mixture of 23 percent of commercial stearamide with 77 percent of glyceryl mono ricinoleate (the percentages being by weight with reference to the entire composition) to a temperature of from 250–300° F. The mixture was stirred constantly during the heating action to insure complete homogeneity, and when all of the stearamide was completely dissolved, the mixture was then quickly chilled in thin layers to room temperature. In this connection we have found that slow cooling in deep trays or cups is undesirable because it produces a product which is lumpy and of non-uniform character, whereas roll chilling or some other procedure by which the mixture is quickly chilled in thin layers gives a final product which is of uniform texture throughout.

The chilled product is not a grease within the ordinary meaning of that word. It has, however, many of the physical properties of a grease and may properly be called a grease-like lubricant. The composition under consideration, for example, has the consistency of a fairly soft cup grease and a dropping point which is of the order of 178° F.

This product was tested for solubility in various substances. It proved to be completely insoluble in water at all temperatures up to 155° F., at which point the test was discontinued. In toluene the composition exhibited no solubility at room temperature and none at 113° F. When the temperature of the toluene was raised to 155° F. it exhibited only a very slight solvent action upon the lubricant which was considered so small as to be negligible. Straight motor gasolines did not dissolve the lubricant at all, and the highly aromatic aviation fuels did not affect it at temperatures below −140° F. At temperatures above 140° F. the lubricant is so slightly soluble in aviation gasoline as to be insignificant.

The lubricating effectiveness of the composition proved good over a wide range of temperature variation. One series of tests designed to demonstrate this property was made upon a brass stopcock of the kind used in aircraft fuel lines at various temperatures between −50° F. and 165° F. The cock was thoroughly cleaned and its plug coated with a thin film of the composition. It was then cooled to a temperature of −20° F. at which point the operation of the valve was smooth and showed no resistance to turning. After this test the valve was allowed to return to room temperature and was found to operate smoothly and without resistance. The test was repeated at various temperatures down to −50° F., at which point its plug turned smoothly but with some effort, though not enough to require the application of a wrench or other forcing means. The resistance at this temperature was only that that might be expected from the thickening of the lubricant at the extreme temperature condition, and gave no evidence of sticking or jerking in its operation. At the other extreme, the value was heated to a temperature as high as 165° F., at which point it was found that the lubricant retained its full effectiveness and that the operation of the valve was extremely easy.

A further test was made of the lubricating effectiveness at −50° F. in a ball tester and in accordance with standard Navy procedures. This test demonstrated conclusively that the composition has good lubricating values at that low point.

A second specific example of our composition has the following formula: 40 percent stearamide and 60 percent glycerol mono ricinoleate, the percentages again being by weight. This producat has the character of a hard lubricating grease and is readily adapted to manufacture in stick form. As such it provides a very useful lubricant for the "Nordstrom" type of valve in which a lubricant stick is retained in a well in the valve body, and is forced between the valve faces by the turning down of a threaded plug. This composition—like the one described heretofore—is completely insoluble in water and resists dissolution by aromatic gasoline, toluene, petroleum fractions, and similar solvents at temperatures well in excess of 100° F. In addition, it retains its lubricating effectiveness over a wide range of temperatures.

We have found that other useful lubricants may be prepared from stearamide and glycerol mono ricinoleate within the range of percentages set forth above. These products will of course have consistencies varying between that of a soft cup grease at the lower end of the scale and a very hard stick lubricant at the upper extreme. The lubricating properties of all these compositions are good under a wide variety of temperature conditions, and all are insoluble in water and, to all intents and purposes, in aromatic gasoline, etc.

In the foregoing we have referred to the lubricant in connection with its use in stopcocks for gasoline lines, but it will be apparent to those skilled in the art that its utility is not so limited. On the contrary, it is well adapted for the lubrication of large plug valves, pump bearings, and other equipment used in the transportation of gasoline and in extensive water distribution systems. Another use to which it may be put is the lubrication of gaskets in the assembly of gasoline lines, for example, in order to prevent the sticking of the gaskets when such lines are subsequently disassembled.

Having described our invention in its preferred form, what we claim is:

1. A lubricant consisting essentially of a mixture of stearamide and glyceryl mono ricinoleate in a ratio by weight of from about 1:4 to about 2:3.

2. A lubricant for valves and the like consisting mainly of a uniform mixture of from 20–40 percent by weight of stearamide, and from 80–60 percent by weight of glyceryl mono ricinoleate, said lubricant being a stable, grease-like gel having a consistency ranging between that of a soft cup grease and a hard grease depending upon the percentage of contained stearamide and being substantially insoluble in water and aromatic gasoline.

3. A lubricant consisting essentially of a mixture of from 20–40 percent by weight of stearamide, and 80–60 percent by weight of glyceryl mono ricinoleate, said lubricant having a stable gel-like character resulting from the heating of said ingredients to a temperature of the order of 250–300° F., followed by quick chilling.

4. A lubricant consisting essentially of a uniform mixture of about 23 percent by weight of stearamide, and about 77 percent by weight of glyceryl mono ricinoleate, said lubricant having a consistency of about that of a soft cup grease.

5. A lubricant for valves and the like consisting essentially of about 23 percent by weight of stearamide, and about 77 percent by weight of glyceryl mono ricinoleate, said lubricant having a stable grease-like consistency resulting from the heating of said ingredients to a temperature of the order of 250–300° F., followed by quick chilling.

6. A lubricant consisting essentially of about 40 percent by weight of stearamide, and about 60 percent by weight of glyceryl mono ricinoleate, said lubricant having the viscosity of a hard grease.

7. A stick lubricant for use in valves and the like consisting essentially of a uniform mixture of about 40 percent by weight of stearamide, and about 60 percent by weight of glyceryl mono ricinoleate, said lubricant having the consistency of a hard grease and being in stick form.

JOHN D. MORGAN.
RUSSELL E. LOWE.